J. HOPKINSON.
COMPUTING SCALE.
APPLICATION FILED NOV. 18, 1913.
1,146,795.
Patented July 20, 1915.
8 SHEETS—SHEET 4.
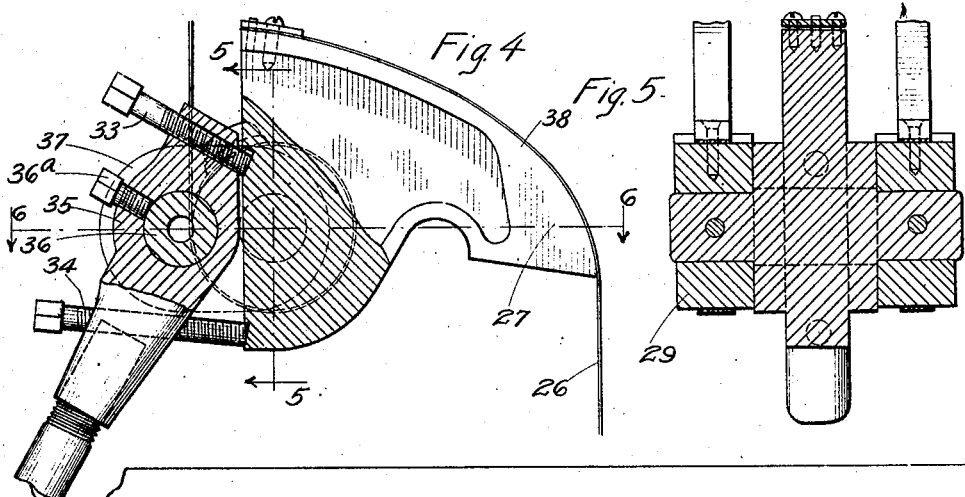
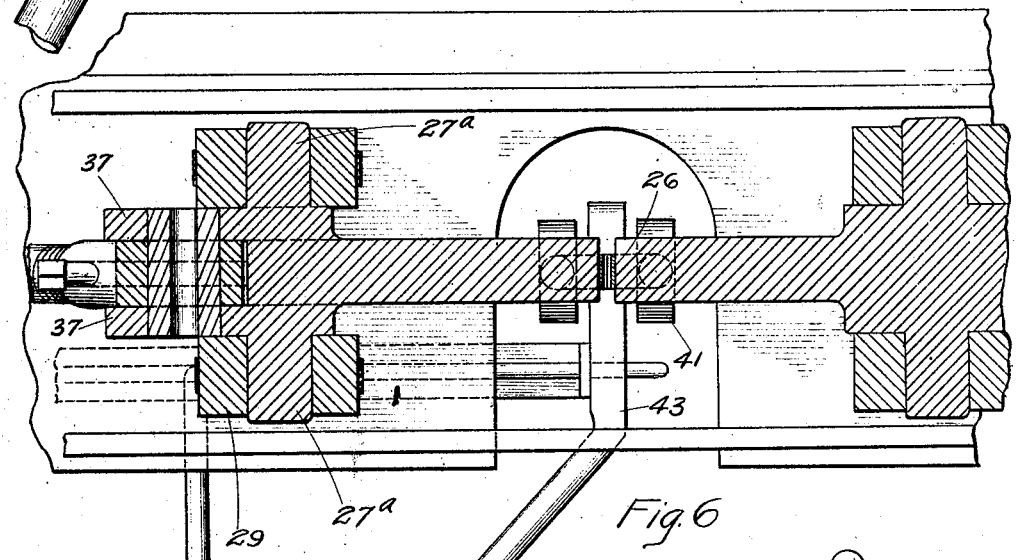
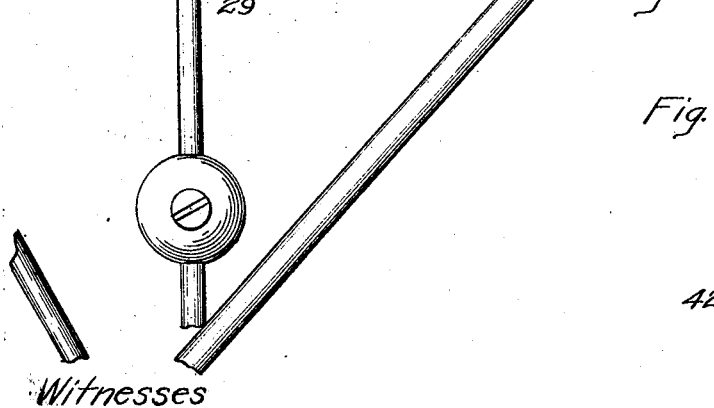
Witnesses
Inventor:
Joseph Hopkinson
By Sheridan, Wilkinson & Scott
Atty's

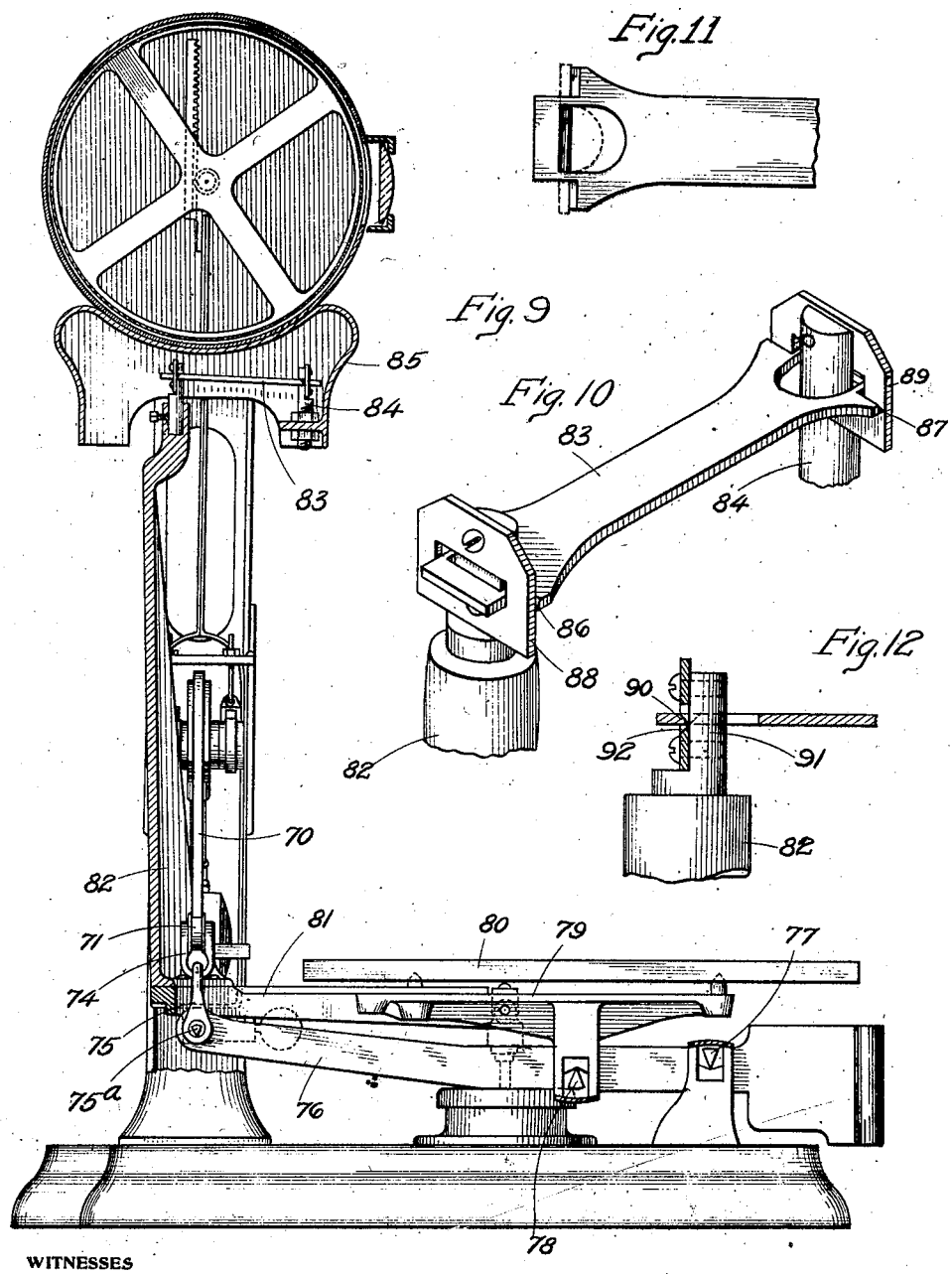

J. HOPKINSON.
COMPUTING SCALE.
APPLICATION FILED NOV. 18, 1913.
1,146,795.
Patented July 20, 1915.
8 SHEETS—SHEET 7.
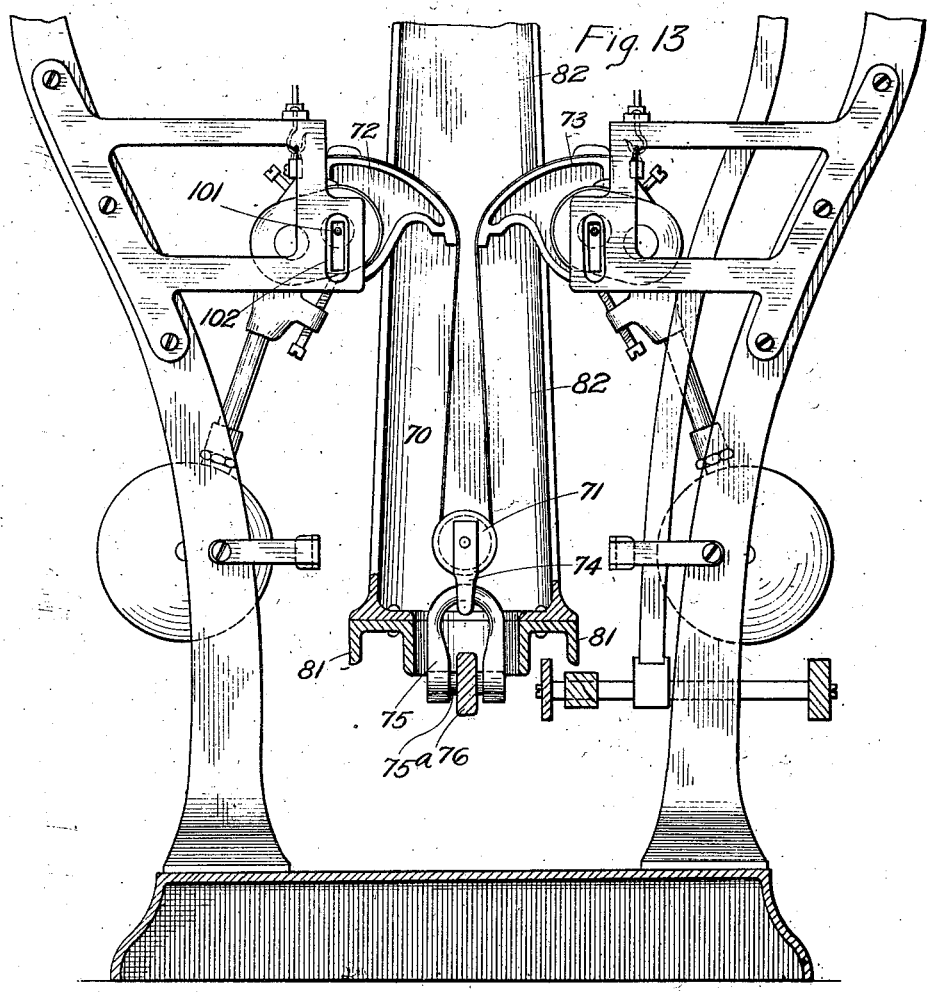
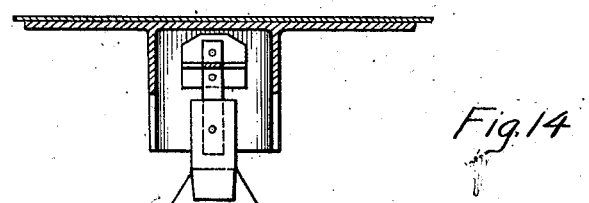
WITNESSES
INVENTOR
Joseph Hopkinson
BY
Sheridan, Wilkinson & Scott ATTORNEYS

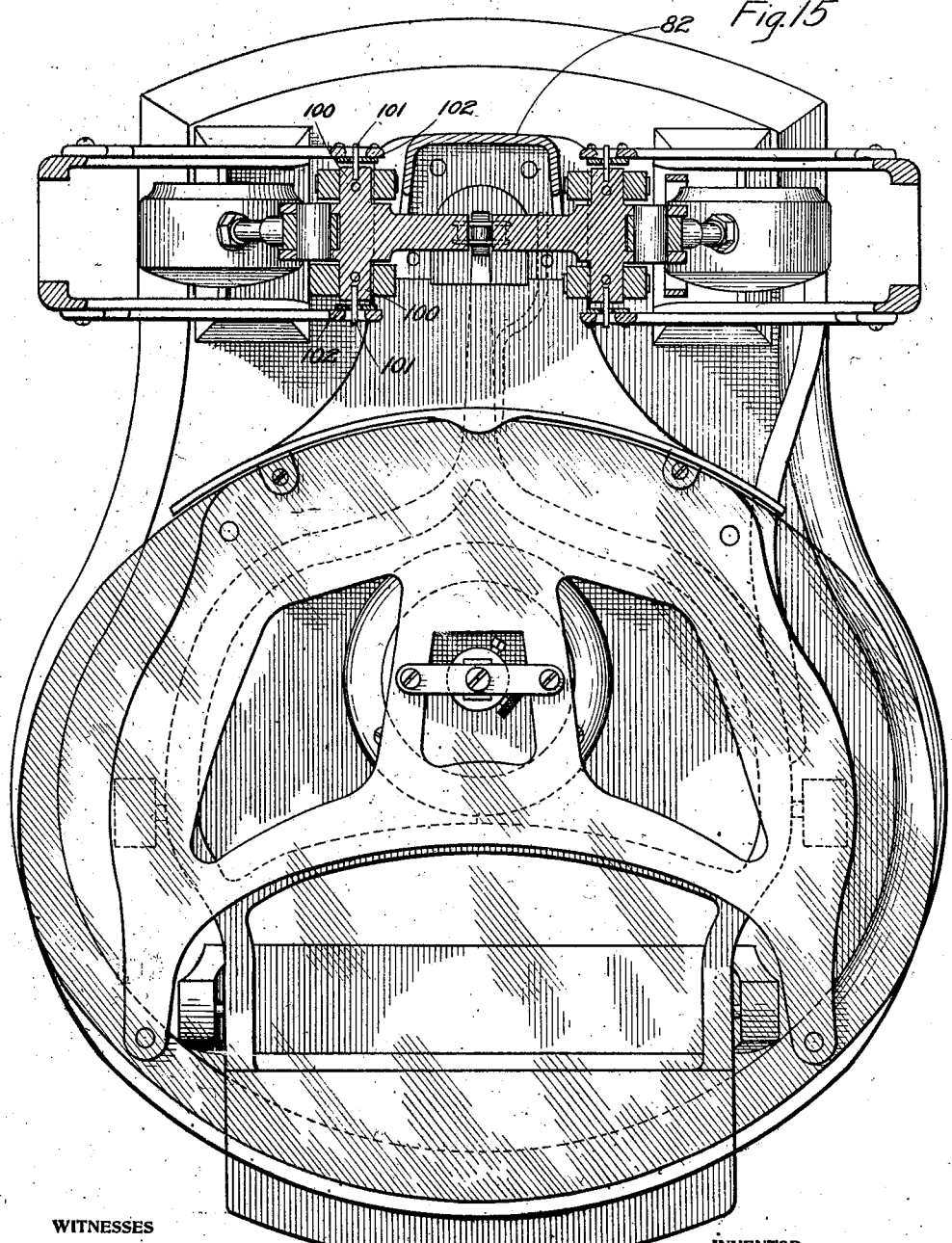

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

COMPUTING-SCALE.

1,146,795.

Specification of Letters Patent. Patented July 20, 1915.

Application filed November 18, 1913. Serial No. 801,623.

*To all whom it may concern:*

Be it known that I, JOSEPH HOPKINSON, a citizen of the United States, residing at Dayton, in the county of Montgomery and State of Ohio, have invented certain new and useful Improvements in Computing-Scales, of which the following is a specification.

My invention relates to the class of computing scales by which the total weight and price are indicated; in which the computing and indicating elements are actuated by the commodity supporting element or platform through suspended mechanism; and in which mechanism the greatest accuracy and reliability in actuating the movable computing and indicating elements are attained. Said computing and indicating elements are preferably elevated above the weighing platform, and the intervening mechanism leading from said platform to said elements is mounted in the frame below said elements and above said platform at one side. Said intervening mechanisms comprise pendulums freely suspended from said frame and so connected to the platform as to effect the desired result in a most efficient manner.

Further objects and advantages of my improved computing scale will become apparent in the following specification, when taken with the accompanying drawings, in which—

Figure 1:
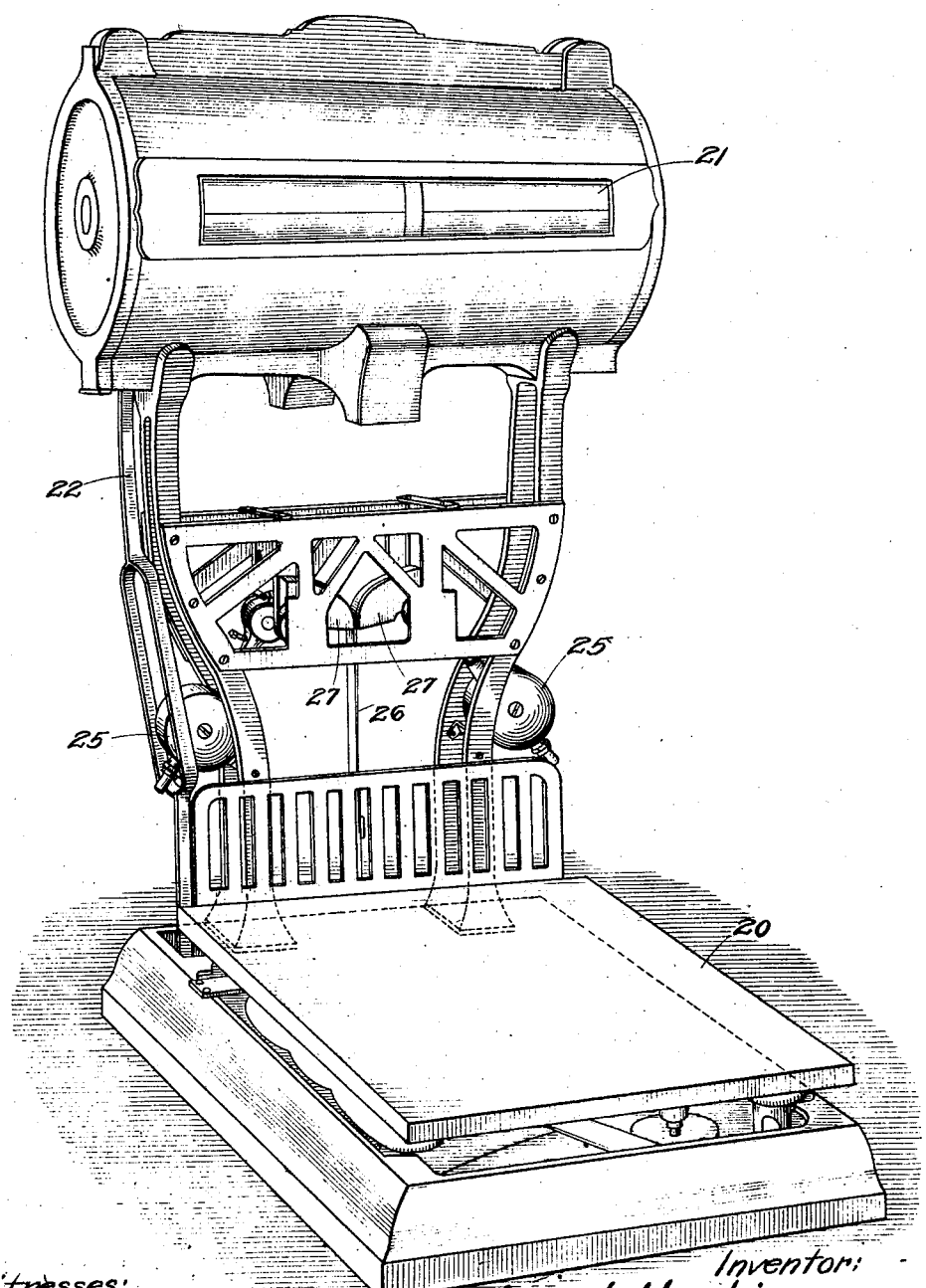
Figure 2:
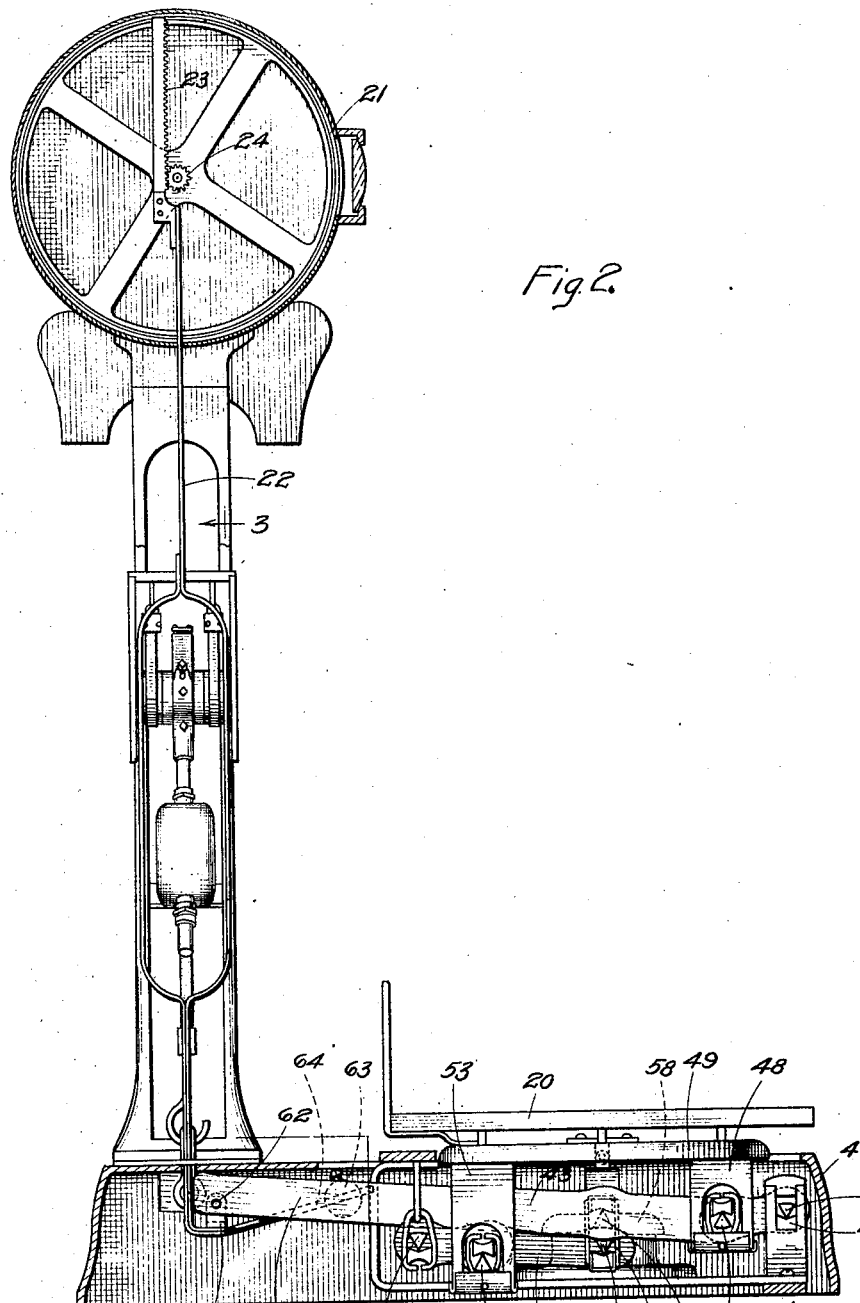
Figure 3:
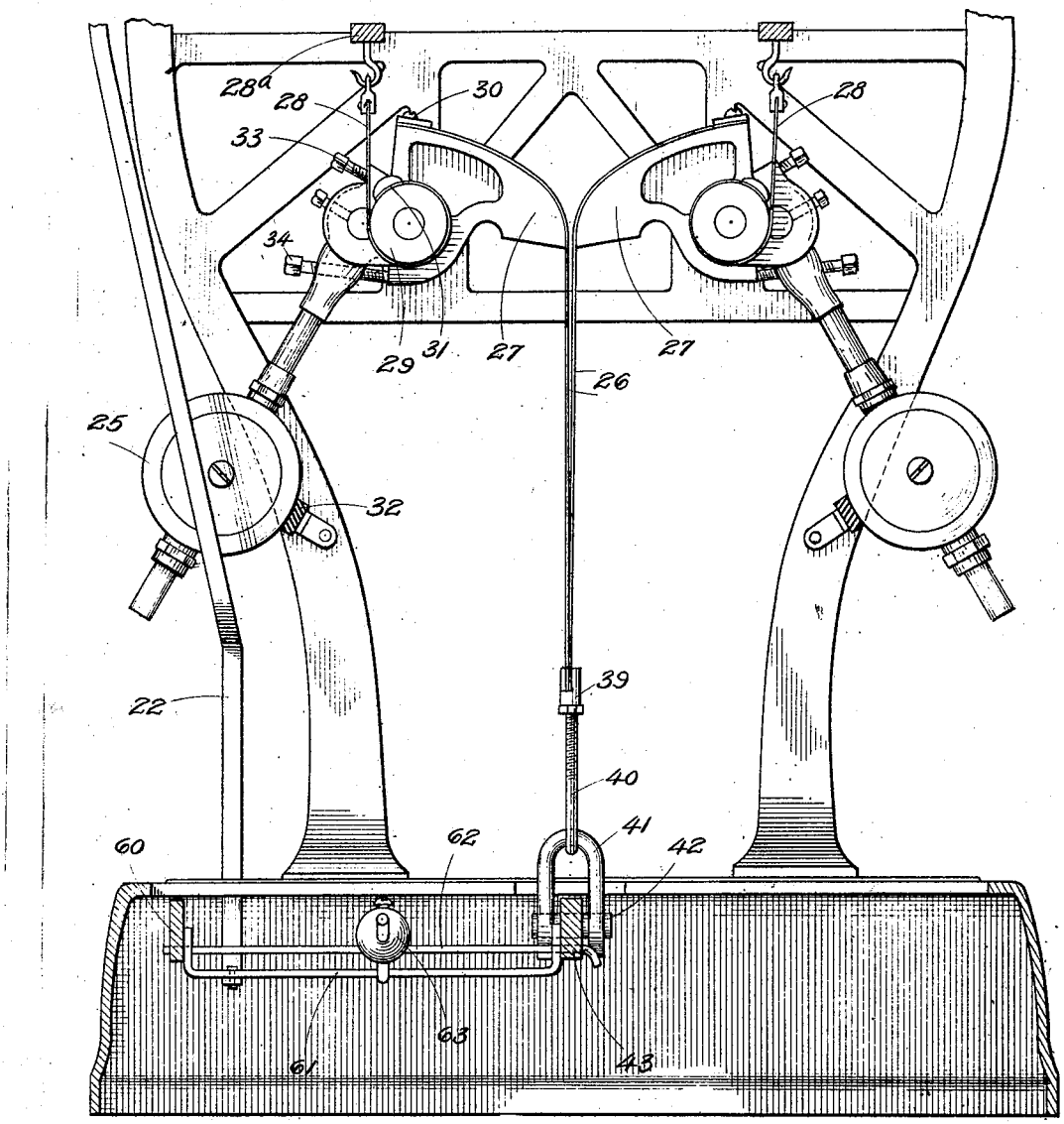
Figure 8:
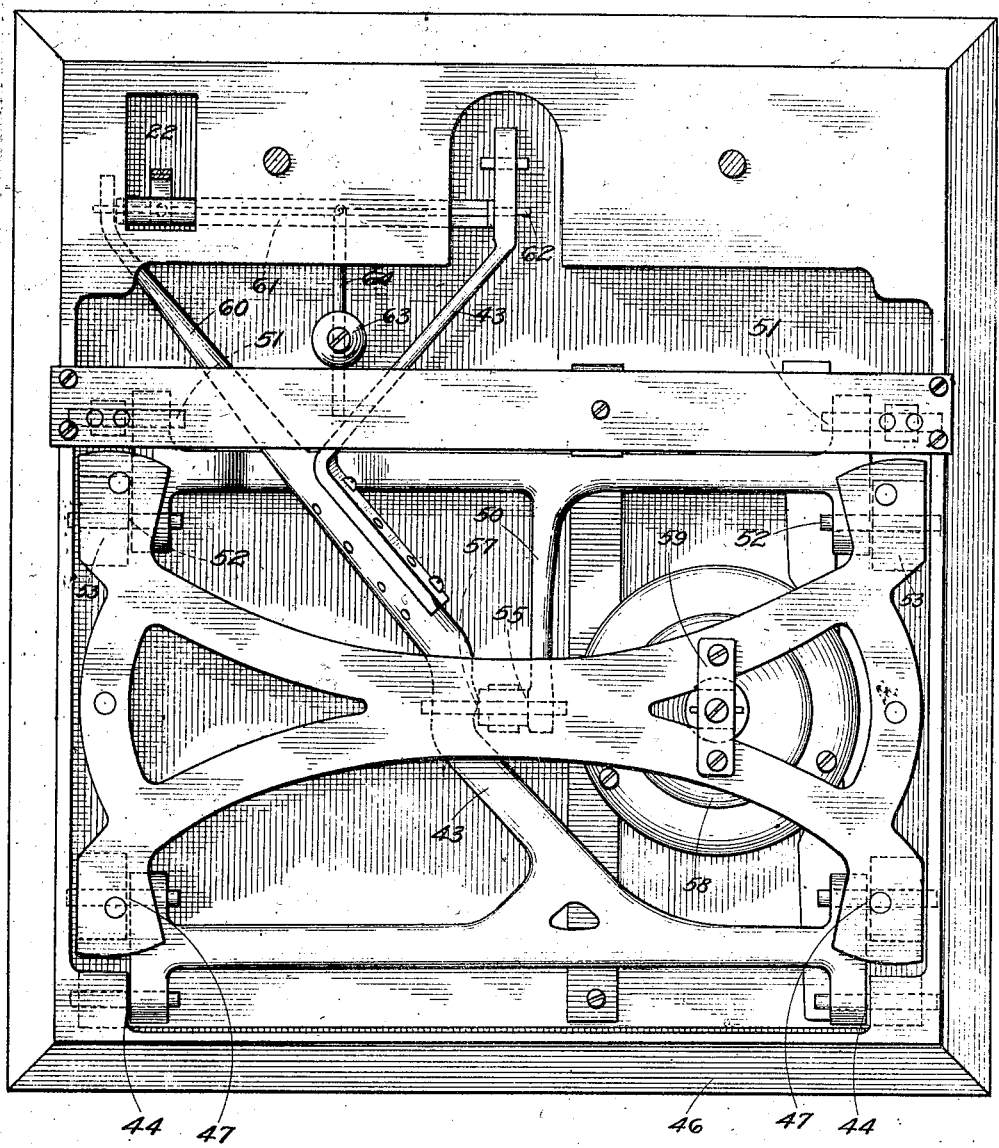

Figure 1 is a perspective view of my improved scale. Fig. 2 is a vertical section just within the lefthand walls of the base and the cylinder casing. Fig. 3 is a vertical section substantially along the line 3, 3 of Fig. 2 showing the pendulum mechanism on a larger scale. Fig. 4 is an enlarged detail partly in section of a hub portion of one of the pendulums. Fig. 5 is a vertical section thereof taken along the line 5, 5 of Fig. 4. Fig. 6 is a horizontal section thereof taken along the line 6, 6 of Fig. 4. Fig. 7 is a detail of the pivotal connections of the lever support with the flexible tapes. Fig. 8 is a plan view of the base of the machine. Fig. 9 is a vertical section partly in elevation of a modified form of my invention. Fig. 10 is a perspective view of the elevated check. Fig. 11 is a plan view of a detail of said check. Fig. 12 is a vertical section thereof. Fig. 13 is an elevation partly in section of pendulum mechanism of said modified form. Fig. 14 is a detail showing the elevated check. Fig. 15 is a horizontal section of said modified form.

As will be seen upon viewing Fig. 1, my improved scale comprises a platform 20, or commodity supporting element, having a position above the base of the machine and an indicating element 21 having an elevated position and operatively connected with the platform mechanism, by a rod 22. The indicating or computing element 21 is illustrated as a revolving cylinder in the present embodiment of my invention and is provided with a pinion 24, which meshes with and is driven by a rack 23 fixed to the upper end of the rod 22. In the upwardly extending portion of the frame I mount two pendulums 25, which are connected with the platform 20 by means of flexible tapes 26, preferably of metal, these tapes being secured at one end to the lever support beneath said platform and at the other end being adapted to roll upon curved elements forming substantially the hubs of said pendulums. The curved faces of the said hubs are illustrated at 27 as projecting inwardly and toward each other and on the sides of the pivot opposite to said pendulums. The pendulums are supported by flexible tapes 28 which are adapted to roll upon concentric or cylindrical portions 29 of said hubs. The upper ends of said last named tapes are secured to cross bars 28ª fixed to the upright portion of the framework. The flexible tapes 26 are secured to the hub portions or arms, 27 by screws 30 and the tapes 28 are secured to the hub portions 29 by similar devices 31. Rubber cushions 32 fixed to the main frame prevent oscillation of the pendulums beyond their normal positions.

The portion 27 of the hub is adjustably connected with the pendulums in an angular manner by set screws 33 and 34. This structure is more particularly set forth in Figs. 4, 5 and 6. The set screw 33 is threaded through the upper end of the pendulum above the pin 36 and the set screw 34 is threaded through said pendulum below said pin. These set screws bear above and below upon the body portion of the arm 27 and obviously provide for varying angular relations of said part 27 and the pendulum. The pin 36 is fixed in the upper portion of the pendulum by suitable means, such as the set screw 36ª, and is pivotally fitted in the cheeks 37 of the arm 27. The part 27 is provided with laterally extending trunnions 27ª upon which are concentrically fixed the rings 29. Around these rings the supporting tapes 28 are adapted to roll.

The upper curved face 38 of the arm 27 is given such a form as will cause said arm to coöperate with the pendulums in all of their different positions in causing the lever supports for the platform to impart movements to the computing cylinder 21, which are at all times proportional to the loads upon said platform.

The lower ends of the tapes 26 are secured to a clip 39, which in turn is attached to the upper end of a hook 40, said hook engaging the yoke 41 pivotally engaging the knife edge 42. Said knife edge is secured in the lever 43, which in turn is pivotally mounted by the knife edge bearing 44—45 upon the base 46. A similar knife edge bearing 47 at the extremity of the short arm of said lever receives the pressure of the downwardly projecting post 48 of the platform element 49. Another lever 50 is provided for receiving the pressure of the other half of the platform element, said lever 50 being fulcrumed by means of the knife edge bearings 51 upon the base of the machine. Similar knife edge bearings 52 at the extremity of the short arm of said lever receive the downward pressure of the posts 53. Other knife edge bearings 55 at the extremity of the long arm of said lever 50 transfer the downward pressure to the link 56, which in turn transfers said pressure through knife edge bearings 57 to the lever 43. An extension 60 of the lever 43 forms a forked structure to which is pivotally attached a yoke 61 by means of a pin 62. To the yoke 61 is secured the rod 22 leading to the computing mechanism. A correcting weight 63 is adjustably mounted upon a rod 64 secured to said yoke 61.

In the modified form shown in Figs. 9 to 15, inclusive, a single flexible supporting tape 70 is attached to both of the hub portions 72 and 73 on the pendulums and has its intermediate portion rolled around an equalizing pulley 71 which is secured to the lever support 76. The means of securing said pulley to said support comprises a yoke 74 in which the pulley is mounted, said yoke engaging a second yoke 75 which receives the knife edge 75ª fixed to the lever 76. The lever 76 in this form is pivotally mounted upon the base by means of knife edge bearings 77. Similar knife edge bearings 78 receive the downward pressure of the platform elements 79. Preferably a glass platform 80 rests upon the elements 79. An extension 81 of said elements 79 carries an upright arm 82, which is movably attached to the upper portion of the frame by what I term the elevated check 83. Said check 83 is pivotally connected to the arm 82 by knife edge bearings and to the post 84 of the upright frame 85 by similar knife edge bearings. Each end of this elevated check is shown in Figs. 10, 11 and 12. The knife edge 86 bears against the vertical plate 88 and a similar knife edge 87 bears against the vertical plate 89. The oppositely disposed knife edge 90 on the piece 83 bears against the flat vertical portion of the pin 91 and the other end of the piece 83 bears against the vertical flat face of the pin 84. By the use of this elevated check a single lever 76 becomes sufficient for supporting the platform and preventing oscillation out of a horizontal position.

In Figs. 13 and 15 the trunnions 100 of the pendulum hubs are provided with pins 101 which move vertically in slotted plates 102 secured to the frame of the machine. The said pins 101 work freely in said slotted plates without contact therewith and prevent vibration of the pendulum hubs.

In the use and operation of my improved scale it will be seen that when commodities are placed upon the platform 20, the weight thereof will cause a downward pressure upon the lever support and said support will in turn cause a tension or pull to be exerted upon the flexible metal tapes 26, in the form shown in Fig. 1. Similar tension will be imparted to the tapes 70 in the form shown in Figs. 9, 13 and 15. The flexible tapes 26 roll upon the curved surface of the hub parts 27 and it will be seen that as the movement continues said tapes will act upon portions of said parts which have smaller radii. In other words, as the movements continue, due to the increasing loads, the parts 27 will present portions of their surfaces to the pull of said tapes which have decreasing radii. Because of said decreasing radii the leverage exerted upon the pendulums will become less and still further increments of load are necessary to produce further movements of the pendulums.

The curved portions of the parts 27 have such a form that their variable radii coöperate with the variable effective weight arms of the pendulums 25 in a manner to cause the different loads to produce proportionate movements of the lever support and hence of the computing mechanism.

The supporting tapes 28 roll upon the concentric portions 29 of the hubs at a constant radius and hence have no effect upon the operation of the parts just described. The tendency, of course, of the tapes 28 is to cause the pendulum to rotate in the same direction as the tapes 26, but the proportions of the parts 27 are such as to compensate for said tendency.

It will be observed (by reference to Fig. 3, for example) that the two flexible elements 26 and 28 attached to the same hub 29, both wind in the same direction around the hub from their points of attachment thereto. In this way, both flexible elements wind simultaneously on the hub or unwind simultaneously therefrom, and as the load increases the hub is lowered though the pendulum is raised.

While I have described my invention more or less precisely as regards details of construction, I do not wish to be limited thereto unduly for the reason that I contemplate changes in the form and the substitution of equivalent parts as circumstances suggest or render expedient without departing from the spirit of my invention.

I claim:

1. In a device of the class described, a commodity supporting element, a lever support for said element, a pendulum having a hub with two parts of different curvature, a flexible supporting element attached to and adapted to roll upon one part of said hub, and a second flexible element secured to said hub and to said lever support and adapted to roll upon the other part of said hub, both said flexible elements winding around said hub in the same direction from their respective points of attachment thereto.

2. In a device of the class described, a commodity supporting element, a lever support for said element, a pendulum having a hub, a flexible supporting element attached to and adapted to roll upon said hub, and a second flexible element secured to said hub and to said lever support and adapted to roll upon said hub, a portion of said hub that receives said second flexible element having a curved form of variable radius coöperating with the variable effective weight arm of said pendulum, whereby different loads upon the commodity supporting element will cause proportionate movements of said lever support, both said flexible elements winding around said hub in the same direction from their respective points of attachment thereto.

3. In a device of the class described, a commodity supporting element, a lever support for said element, a pendulum having a hub, a flexible supporting element attached to and adapted to roll upon said hub, a second flexible element secured to said hub and to said lever support and adapted to roll upon said hub, a portion of said hub that receives said second flexible element having a curved form of variable radius coöperating with the variable effective weight arm of said pendulum, whereby different loads upon the commodity supporting element will cause proportionate movements of said lever support, and computing mechanism actuated by said lever support, both said flexible elements winding around said hub in the same direction from their respective points of attachment thereto.

4. In a device of the class described, a commodity supporting element, a lever support for said element, a pendulum having a hub, a flexible supporting element attached to and adapted to roll upon said hub, a second flexible element secured to said hub and to said lever support and adapted to roll upon said hub, both said flexible elements winding around said hub in the same direction from their respective points of attachment thereto, a portion of said hub that receives said second flexible element having a curved form of variable radius coöperating with the variable effective weight arm of said pendulum, whereby different loads upon the commodity supporting element will cause proportionate movements of said lever support, computing mechanism actuated by said lever support, and a frame having a portion elevated above said commodity supporting element for carrying said computing mechanism.

5. In a device of the class described, a commodity supporting element, a lever support for said element, a pendulum having a hub, a flexible supporting element attached to and adapted to roll upon said hub, a second flexible element secured to said hub and to said lever support and adapted to roll upon said hub, a portion of said hub that receives said second flexible element having a curved form of variable radius coöperating with the variable effective weight arm of said pendulum, whereby different loads upon the commodity supporting element will cause proportionate movements of said lever support, computing mechanism actuated by said lever support, a frame having a portion elevated above said commodity supporting element for carrying said computing mechanism, an elevated extension fixed to said commodity supporting element, and means for movably attaching said extension to the elevated portion of the frame.

6. In a device of the class described, a commodity supporting element, a lever support for said element, pendulums, hubs for said pendulums with parts of different curvature, flexible supporting elements attached to and adapted to roll upon parts of the hubs of said pendulums, and flexible supporting elements attached to said lever support and adapted to roll upon other parts of said hubs having different curvature, all said flexible elements that are attached to each hub winding around said hub in the same direction from their respective points of attachment thereto.

7. In a device of the class described, a commodity supporting element, a lever support for said element, pendulums, flexible supporting elements attached to and adapted to roll upon the hubs of said pendulums, a second flexible supporting element attached to said pendulums, and a pulley attached to said lever support and with said second flexible supporting element passing thereunder, whereby the tension imparted by said lever support to said second flexible supporting element is equally divided and imparted to said pendulums.

8. In a device of the class described, a commodity supporting element, a lever support for said element, two symmetrically formed pendulums, flexible supporting elements attached to and adapted to roll upon certain parts of the hubs of said pendulums, and flexible supporting elements attached to said lever support and said hubs and adapted to roll upon other parts of said hubs of different curvature, said pendulums being symmetrically disposed with reference to the point of attachment of said last named supporting element to said lever support, all said flexible elements that are attached to each hub winding around said hub in the same direction from their respective points of attachment thereto.

9. In a device of the class described, a commodity supporting element, a lever support for said element, two symmetrically formed pendulums, flexible supporting elements attached to and adapted to roll upon the hubs of said pendulums, flexible supporting elements attached to said lever support and said hubs and adapted to roll upon said hubs, said pendulums being symmetrically disposed with reference to the point of attachment of said last named supporting element to said lever support, and a pulley at said point of attachment by which the tension transmitted to said elements by said lever support is equally divided and imparted to said elements and thence to said pendulums.

10. In a device of the class described, a commodity supporting element, a lever support for said element, two symmetrically formed pendulums, flexible supporting elements attached to and adapted to roll upon certain parts of the hubs of said pendulums, flexible supporting elements attached to said lever support and said hubs and adapted to roll upon other parts of said hubs of different curvature, all said flexible elements that are attached to each hub winding around said hub in the same direction from their respective points of attachment thereto, said pendulums being symmetrically disposed with reference to the point of attachment of said last named supporting elements to said lever support and a frame having an elevated portion rising above said commodity supporting element and holding the free ends of said first named flexible supporting elements.

11. In a device of the class described, a commodity suporting element, a lever support for said element, two symmetrically formed pendulums, flexible supporting elements attached to and adapted to roll upon certain parts of the hubs of said pendulums, flexible supporting elements attached to said lever support and said hubs and adapted to roll upon other parts of said hubs of different curvature, all said flexible elements that are attached to each hub winding around said hub in the same direction from their respective points of attachment thereto, said pendulums being symmetrically disposed with reference to the point of attachment of said last named supporting elements to said lever support, a frame having an elevated portion rising above said commodity supporting element and holding the free ends of said first named flexible supporting elements, computing mechanism mounted upon said elevated portion, and means operatively connecting said lever support and said computing mechanism.

12. In a device of the class described, a commodity supporting element, a lever support for said element, a pendulum having a hub adjustably attached thereto, said hub having an intermediate part of one curvature and adjacent parts on each side of another curvature, a flexible supporting element secured to said hub and to said lever support and adapted to roll upon the intermediate part of the hub, and flexible supporting elements attached to fixed points and to the hubs and adapted to roll on the side parts of the hubs.

13. In a device of the class described, a commodity supporting element, a lever support for said element, a pendulum having a hub having a curved face of variable radius adjustably attached to said pendulum, a flexible supporting element secured to said hub and to said lever support and adapted to roll upon said curved face, said hub having also a concentric portion of uniform radius, and a second flexible supporting element secured to said hub and adapted to roll upon said concentric portion.

14. In a device of the class described, a commodity supporting element, a lever support for said element, a pendulum having a hub, a flexible supporting element attached to and adapted to roll upon said hub, a second flexible element secured to said hub and to said lever support and adapted to roll upon said hub, a frame having an elevated extension to which said first named flexible element is attached, and a pin and slot guide for said hub.

15. In a device of the class described, a commodity supporting element, a lever support for said element, a pendulum having a hub, a flexible supporting element attached to and adapted to roll upon a certain part of said hub, a second flexible element secured to said hub and to said lever support and adapted to roll upon another part of said hub of different curvature, all said flexible elements that are attached to each hub winding around said hub in the same direction from their respective points of attachment thereto, a frame having an elevated extension to which said first named flexible element is attached, computing mechanism mounted upon said extension, and means operatively connecting said computing mechanism and said lever support.

16. In a device of the class described, a commodity supporting element, a lever support for said element, a pendulum having a hub, a flexible supporting element attached to and adapted to roll upon said hub, and a second flexible element secured to said hub and to said lever support and adapted to roll upon said hub, said hub being divided into two relatively adjustable parts, one of which is fixed to said pendulum, said flexible supporting element rolling upon one of said parts, and said second flexible element rolling upon the other of said parts.

17. In a device of the class described, a commodity supporting element, a lever support for said element, a pendulum having a hub, a flexible supporting element attached to and adapted to roll upon said hub, and a second flexible element secured to said hub and to said lever support and adapted to roll upon said hub, said hub being divided into two relatively adjustable parts, one of which is fixed to said pendulum, said flexible supporting element rolling upon one of said parts, and said second flexible element rolling upon the other of said parts, the adjustment of said parts being in an angular relation about their common axis of rotation whereby the relation between the effective weight arm of said pendulum and of the effective radius of one of said parts may be varied.

18. In a device of the class described, a commodity supporting element, a lever support for said element, a pendulum having a hub, a flexible supporting element attached to and adapted to roll upon said hub, and a second flexible element secured to said hub and to said lever support and adapted to roll upon said hub, and a pin and slot guide for guiding said hubs in a vertical direction.

19. In a device of the class described, a fixed supporting frame, two flexible tapes hanging therefrom, a pendulum with a hub having three curved surfaces side by side, the lower ends of said tapes being attached to the outer curved surfaces and adapted to wrap thereon, another flexible tape attached to the intermediate curved surface, a commodity supporting element operatively attached to said last mentioned flexible tape, all said tapes winding around said hub in the same direction from their respective points of attachment thereto, and a rotatable indicator with a fixed axis operatively connected to said commodity-supporting element.

20. In a device of the class described, a fixed supporting frame, a flexible tape hanging therefrom, a pendulum with a hub having two parts of different curvature, said flexible tape being attached to one said part, another flexible tape attached to the other said part, a commodity supporting element attached to said last mentioned flexible tape, both said tapes winding around said hub in the same direction from their respective points of attachment thereto, and a rotatable indicator with a fixed axis operatively connected to said commodity-supporting element.

In testimony whereof, I have subscribed my name.

JOSEPH HOPKINSON.

Witnesses:
A. S. HENDRICKS,
H. A. LEONARD.